United States Patent
Fang et al.

(10) Patent No.: US 11,080,581 B2
(45) Date of Patent: Aug. 3, 2021

(54) INTELLIGENT WEARABLE DEVICE AND POWER SUPPLY METHOD FOR INTELLIGENT WEARABLE DEVICE

(71) Applicant: Huawei Technologies Co., Ltd., Shenzhen (CN)

(72) Inventors: Qingyin Fang, Shenzhen (CN); Weifeng Duan, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 296 days.

(21) Appl. No.: 15/965,461

(22) Filed: Apr. 27, 2018

(65) Prior Publication Data

US 2018/0247172 A1 Aug. 30, 2018

Related U.S. Application Data

(63) Continuation of application No. PCT/CN2016/080360, filed on Apr. 27, 2016.

(30) Foreign Application Priority Data

Oct. 31, 2015 (CN) .......................... 201510728092.X (51) Int. Cl.
*H02J 7/34* (2006.01)
*G06K 19/07* (2006.01)
(Continued)

(52) U.S. Cl.
CPC ..... *G06K 19/0704* (2013.01); *G06K 19/0705* (2013.01); *G06K 19/0707* (2013.01);
(Continued)

(58) Field of Classification Search
CPC .......... G06K 19/0704; G06K 19/0705; G06K 19/0707; G06K 19/07762; G06K 19/0702;
(Continued)

(56) References Cited

U.S. PATENT DOCUMENTS 6,405,213 B1* 6/2002 Layson .............. G08B 21/0286
707/758
8,742,623 B1* 6/2014 Biederman .......... A61B 5/6821
307/80

(Continued)

FOREIGN PATENT DOCUMENTS

CN 1901319 A 1/2007
CN 101202555 A 6/2008
(Continued)

OTHER PUBLICATIONS

Machine Translation and Abstract of Chinese Publication No. CN101202555, Jun. 18, 2008, 8 pages.
(Continued)

*Primary Examiner* — Rexford N Barnie
*Assistant Examiner* — Brian K Baxter
(74) *Attorney, Agent, or Firm* — Conley Rose, P.C.

(57) ABSTRACT

An intelligent wearable device and a power supply method for the intelligent wearable device are provided, which can prolong a standby time of a battery such that the intelligent wearable device can still complete a main function within a specific time period when the battery cannot output a current. The intelligent wearable device including a controller configured to control a non-basic functional circuit to stop working, and control a self-powered circuit to supply power to a basic functional circuit when the output voltage is less than a first voltage threshold; or control the self-powered circuit and the battery-powered circuit to supply power to the basic functional circuit and the non-basic functional circuit when the output voltage is greater than or equal to the first voltage threshold. The intelligent wearable device is applied to the field of customer electronics.

16 Claims, 4 Drawing Sheets

(51) Int. Cl.
*H02J 7/00* (2006.01)
*H02J 9/00* (2006.01)
*G06K 19/077* (2006.01)

(52) U.S. Cl.
CPC ...... *G06K 19/07762* (2013.01); *H02J 7/0031* (2013.01); *H02J 7/34* (2013.01); *H02J 9/002* (2013.01); *H02J 7/00306* (2020.01)

(58) Field of Classification Search
CPC .. H02J 7/0031; H02J 7/34; H02J 9/002; H02J 7/00306
USPC .......................................................... 307/29
See application file for complete search history.

(56) References Cited

U.S. PATENT DOCUMENTS

| | | | | |
|---|---|---|---|---|
| 9,018,893 | B2* | 4/2015 | Track | A61M 5/14244 320/103 |
| 9,479,212 | B1* | 10/2016 | Garcia | G06F 1/203 |
| 9,734,477 | B2* | 8/2017 | Weast | G16H 40/63 |
| 9,997,039 | B1* | 6/2018 | Heaton | G08B 21/0423 |
| 2007/0029969 | A1 | 2/2007 | Wang et al. | |
| 2007/0046258 | A1 | 3/2007 | Defant et al. | |
| 2007/0129651 | A1* | 6/2007 | Shin | A61H 23/0245 601/2 |
| 2009/0026839 | A1* | 1/2009 | Drageset | G06F 1/263 307/32 |
| 2010/0207571 | A1* | 8/2010 | English | H01M 10/0525 320/101 |
| 2011/0066041 | A1* | 3/2011 | Pandia | A61B 5/029 600/484 |
| 2012/0153740 | A1* | 6/2012 | Soar | F41H 1/02 307/104 |
| 2014/0244009 | A1* | 8/2014 | Mestas | A63B 24/0062 700/91 |
| 2014/0246497 | A1* | 9/2014 | Proud | G06K 19/07762 235/492 |
| 2014/0246500 | A1* | 9/2014 | Proud | G06K 19/07762 235/492 |
| 2014/0253487 | A1* | 9/2014 | Bezinge | G04G 17/045 345/173 |
| 2014/0266571 | A1* | 9/2014 | Sharma | G09B 21/003 340/4.12 |
| 2014/0266731 | A1* | 9/2014 | Malhotra | G06F 1/163 340/573.1 |
| 2014/0378853 | A1 | 12/2014 | McKinney et al. | |
| 2015/0135284 | A1* | 5/2015 | Bogard | G06F 21/35 726/5 |
| 2015/0137994 | A1* | 5/2015 | Rahman | H04Q 9/04 340/870.07 |
| 2015/0365173 | A1* | 12/2015 | Yamasaki | H04B 10/1149 398/126 |
| 2016/0038083 | A1* | 2/2016 | Ding | A61B 5/6804 600/388 |
| 2016/0064955 | A1* | 3/2016 | Zuerner | H02J 7/007 705/39 |
| 2016/0128151 | A1* | 5/2016 | Luick | H05B 47/16 307/19 |
| 2016/0183880 | A1* | 6/2016 | Abe | A61B 5/721 600/301 |
| 2016/0215970 | A1* | 7/2016 | Tiffin | A41D 19/002 |
| 2016/0342140 | A1* | 11/2016 | Baba | G04G 21/04 |
| 2017/0127354 | A1* | 5/2017 | Garland | H04B 1/385 |
| 2017/0243385 | A1* | 8/2017 | Mitsugi | G04G 21/02 |
| 2018/0279915 | A1* | 10/2018 | Huang | A61B 5/002 |

FOREIGN PATENT DOCUMENTS

| | | |
|---|---|---|
| CN | 102497471 A | 6/2012 |
| CN | 103399483 A | 11/2013 |
| CN | 104052108 A | 9/2014 |
| CN | 104377399 A | 2/2015 |
| CN | 104505551 A | 4/2015 |
| CN | 105244964 A | 1/2016 |
| JP | 2000307689 A | 11/2000 |

OTHER PUBLICATIONS

Machine Translation and Abstract of Chinese Publication No. CN102497471, Jun. 13, 2012, 15 pages.
Machine Translation and Abstract of Chinese Publication No. CN103399483, Nov. 20, 2013, 20 pages.
Machine Translation and Abstract of Chinese Publication No. CN104052108, Sep. 17, 2014, 20 pages.
Machine Translation and Abstract of Chinese Publication No. CN104377399, Feb. 25, 2015, 11 pages.
Machine Translation and Abstract of Chinese Publication No. CN104505551, Apr. 8, 2015, 15 pages.
Machine Translation and Abstract of Chinese Publication No. CN105244964, Jan. 13, 2016, 32 pages.
Machine Translation and Abstract of Japanese Publication No. JP2000307689, Nov. 2, 2000, 12 pages.
Yanhuan, W., et al., "Design of Dynamic Power Management for Embedded System," Communication and Information System, May 2010, 56 pages.
Foreign Communication From a Counterpart Application, Chinese Application No. 201510728092.X, Chinese Office Action dated Mar. 28, 2017, 14 pages.
Foreign Communication From a Counterpart Application, PCT Application No. PCT/CN2016/080360, English Translation of International Search Report dated Jul. 29, 2016, 2 pages.

* cited by examiner

INTELLIGENT WEARABLE DEVICE AND POWER SUPPLY METHOD FOR INTELLIGENT WEARABLE DEVICE

CROSS-REFERENCE TO RELATED APPLICATIONS

This application is a continuation of International Application No. PCT/CN2016/080360, filed on Apr. 27, 2016, which claims priority to Chinese Patent Application No. 201510728092.X, filed on Oct. 31, 2015, both of which are hereby incorporated by reference in their entireties.

TECHNICAL FIELD

The present disclosure relates to the electronics field, and in particular, to an intelligent wearable device and a power supply method for the intelligent wearable device.

BACKGROUND

With rapid development of a smart sensor technology, demands for intelligent wearable devices (including a smart band, a smart watch, or the like) begin to grow explosively. The intelligent wearable device generally has a main function, for example, an exercise detection function of a smart sports band and a health detection function of a smart health monitoring band. The intelligent wearable device further has some other functions, for example, functions such as a Global Positioning System (GPS), Bluetooth® calling, and music playing.

Currently, limited by a size of the intelligent wearable device, a capacity of a battery in the intelligent wearable device is commonly small. For example, a capacity of a lithium-ion battery configured for the smart band or the smart watch is less than 100 milliampere-hours (mAh). To prolong a standby time of a battery in an intelligent wearable device, a micro control unit (MCU) of the intelligent wearable device controls another functional unit other than a functional unit for a main function to rapidly enter a sleep mode after the another functional unit rapidly completes data exchange in order to reduce power consumption of the another functional unit. For example, for a display unit, the MCU enables the display unit only when it is detected that a user performs a key operation or a screen-touching operation, and presets an enabling time (for example, 5 seconds) for the display module. When the preset enabling time expires, the MCU controls the display unit again to enter a sleep mode.

A standby time of a battery in an intelligent wearable device is prolonged to some extent using the foregoing solution. However, if the intelligent wearable device is worn by a person, when a current cannot be output because of a low voltage of the battery in the intelligent wearable device, that is, when the battery cannot supply power, the intelligent wearable device cannot continue completing a main function of the intelligent wearable device. Consequently, user experience is affected.

SUMMARY

The present disclosure provides an intelligent wearable device and a power supply method for the intelligent wearable device, to prolong a standby time of a battery such that the intelligent wearable device can still complete a main function within a specific time period when the battery cannot output a current.

The following technical solutions are used in the present disclosure to achieve the foregoing objective.

According to a first aspect, an embodiment of the present disclosure provides an intelligent wearable device, including a control unit, and a battery-powered unit, a self-powered unit, a basic functional unit, and a non-basic functional unit that are connected to the control unit; where the control unit is configured to detect an output voltage of the battery-powered unit when the intelligent wearable device is worn; the control unit is further configured to, when the output voltage is less than a preset first voltage threshold, control the non-basic functional unit to stop working, and control the self-powered unit to supply power to the basic functional unit, where when the output voltage is less than the first voltage threshold, it indicates that the battery-powered unit cannot output a current; the control unit is further configured to, when the output voltage is greater than or equal to the preset first voltage threshold, control the self-powered unit and the battery-powered unit to supply power to the basic functional unit and the non-basic functional unit; the self-powered unit continuously generates power when the intelligent wearable device is worn; the basic functional unit is configured to complete a main function of the intelligent wearable device under control of the control unit; and the non-basic functional unit is configured to complete another function other than the main function in functions of the intelligent wearable device under control of the control unit.

In a first possible implementation of the first aspect, the control unit is further configured to send a sleep instruction to the non-basic functional unit when the output voltage is less than the preset first voltage threshold, where the sleep instruction is used to instruct the non-basic functional unit to enter a sleep mode; and the non-basic functional unit is configured to receive the sleep instruction sent by the control unit, and enter the sleep mode according to an indication of the sleep instruction.

With reference to the first possible implementation of the first aspect, in a second possible implementation, the control unit is further configured to, after sending the sleep instruction to the non-basic functional unit, if it is detected that the output voltage is greater than or equal to a preset second voltage threshold, send a working instruction to the non-basic functional unit, where the working instruction is used to instruct the non-basic functional unit to enter a working mode, and the second voltage threshold is greater than or equal to the first voltage threshold; and the non-basic functional unit is further configured to receive the working instruction sent by the control unit, and enter the working mode according to an indication of the working instruction.

With reference to the first aspect, in a third possible implementation of the first aspect, the control unit is further configured to disable the non-basic functional unit when the output voltage is less than the preset first voltage threshold.

With reference to the third possible implementation of the first aspect, in a fourth possible implementation, the control unit is further configured to, after disabling the non-basic functional unit, if it is detected that the output voltage is greater than or equal to a preset second voltage threshold, enable the non-basic functional unit, where the second voltage threshold is greater than or equal to the first voltage threshold.

With reference to the first aspect, in a fifth possible implementation of the first aspect, the control unit is further configured to disable the battery-powered unit when the output voltage is less than the preset first voltage threshold.

With reference to the fifth possible implementation of the first aspect, in a sixth possible implementation, the control unit is further configured to, after disabling the battery-powered unit, if it is detected that the output voltage is greater than or equal to a preset second voltage threshold, enable the battery-powered unit, where the second voltage threshold is greater than or equal to the first voltage threshold.

With reference to the first aspect, or the first possible implementation of the first aspect to the fifth possible implementation of the first aspect, in a seventh possible implementation, the self-powered unit includes a power generation module and a voltage conversion module that is connected to the power generation module, the control unit, the basic functional unit, and the non-basic functional unit; the power generation module is configured to obtain environment energy, convert the environment energy into a first voltage, and transmit the first voltage to the voltage conversion unit; and the voltage conversion module is configured to receive the first voltage transmitted by the power generation module, and convert the first voltage into a working voltage of the intelligent wearable device.

According to a second aspect, an embodiment of the present disclosure provides a power supply method for an intelligent wearable device, and the method includes detecting, by the intelligent wearable device, an output voltage of a battery-powered unit of the intelligent wearable device when the intelligent wearable device is worn; and when the output voltage is less than a preset first voltage threshold, controlling, by the intelligent wearable device, a non-basic functional unit of the intelligent wearable device to stop working, and controlling a self-powered unit of the intelligent wearable device to supply power to a basic functional unit of the intelligent wearable device, where when the output voltage is less than the first voltage threshold, it indicates that the battery-powered unit cannot output a current; or when the output voltage is greater than or equal to the preset first voltage threshold, controlling, by the intelligent wearable device, the self-powered unit and the battery-powered unit to supply power to the basic functional unit and the non-basic functional unit; where the self-powered unit continuously generates power when the intelligent wearable device is worn; the basic functional unit is configured to complete a main function of the intelligent wearable device; and the non-basic functional unit is configured to complete another function other than the main function in functions of the intelligent wearable device.

In a first possible implementation of the second aspect, the controlling, by the intelligent wearable device, a non-basic functional unit of the intelligent wearable device to stop working includes sending, by the intelligent wearable device, a sleep instruction to the non-basic functional unit, where the sleep instruction is used to instruct the non-basic functional unit to enter a sleep mode.

With reference to the first possible implementation of the second aspect, in a second possible implementation, after the sending, by the intelligent wearable device, a sleep instruction to the non-basic functional unit, the method further includes, if the intelligent wearable device detects that the output voltage is greater than or equal to a preset second voltage threshold, sending, by the intelligent wearable device, a working instruction to the non-basic functional unit, where the working instruction is used to instruct the non-basic functional unit to enter a working mode, and the second voltage threshold is greater than or equal to the first voltage threshold.

With reference to the second aspect, in a third possible implementation of the second aspect, the controlling, by the intelligent wearable device, a non-basic functional unit of the intelligent wearable device to stop working includes disabling, by the intelligent wearable device, the non-basic functional unit.

With reference to the third possible implementation of the second aspect, in a fourth possible implementation, after the disabling, by the intelligent wearable device, the non-basic functional unit, the method further includes, if the intelligent wearable device detects that the output voltage is greater than or equal to a preset second voltage threshold, enabling, by the intelligent wearable device, the non-basic functional unit, where the second voltage threshold is greater than or equal to the first voltage threshold.

With reference to the second aspect, in a fifth possible implementation of the second aspect, when the output voltage is less than the preset first voltage threshold, the method further includes disabling, by the intelligent wearable device, the battery-powered unit.

With reference to the fifth possible implementation of the second aspect, in a sixth possible implementation, after the disabling, by the intelligent wearable device, the battery-powered unit, the method further includes, if the intelligent wearable device detects that the output voltage is greater than or equal to a preset second voltage threshold, enabling, by the intelligent wearable device, the battery-powered unit, where the second voltage threshold is greater than or equal to the first voltage threshold.

According to a third aspect, an embodiment of the present disclosure provides a control apparatus, including a detection module and a control module, where the detection module is configured to detect an output voltage of a battery-powered unit of an intelligent wearable device when the intelligent wearable device is worn; and the control module is configured to, when the detection unit detects that the output voltage is less than a preset first voltage threshold, control a non-basic functional unit of the intelligent wearable device to stop working, and control a self-powered unit of the intelligent wearable device to supply power to a basic functional unit of the intelligent wearable device, where when the output voltage is less than the first voltage threshold, it indicates that the battery-powered unit cannot output a current; and the control module is further configured to, when the detection unit detects that the output voltage is greater than or equal to the preset first voltage threshold, control the self-powered unit and the battery-powered unit to supply power to the basic functional unit and the non-basic functional unit; where the self-powered unit continuously generates power when the intelligent wearable device is worn; the basic functional unit is configured to complete a main function of the intelligent wearable device; and the non-basic functional unit is configured to complete another function other than the main function in functions of the intelligent wearable device.

In a first possible implementation of the third aspect, the control module is further configured to send a sleep instruction to the non-basic functional unit, where the sleep instruction is used to instruct the non-basic functional unit to enter a sleep mode.

With reference to the first possible implementation of the third aspect, in a second possible implementation, the control module is further configured to, after sending the sleep instruction to the non-basic functional unit, if the detection module detects that the output voltage is greater than or equal to a preset second voltage threshold, send a working instruction to the non-basic functional unit, where the working instruction is used to instruct the non-basic functional unit to enter a working mode, and the second voltage threshold is greater than or equal to the first voltage threshold.

With reference to the third aspect, in a third possible implementation of the third aspect, the control module is further configured to disable the non-basic functional unit.

With reference to the third possible implementation of the third aspect, in a fourth possible implementation, the control module is further configured to, after disabling the non-basic functional unit, if the detection module detects that the output voltage is greater than or equal to a preset second voltage threshold, enable the non-basic functional unit, where the second voltage threshold is greater than or equal to the first voltage threshold.

With reference to the third aspect, in a fifth possible implementation of the third aspect, the control module is further configured to disable the battery-powered unit when the output voltage is less than the preset first voltage threshold.

With reference to the fifth possible implementation of the third aspect, in a sixth possible implementation, the control module is further configured to, after disabling the battery-powered unit, if the detection module detects that the output voltage is greater than or equal to a preset second voltage threshold, enable the battery-powered unit, where the second voltage threshold is greater than or equal to the first voltage threshold.

The present disclosure provides the intelligent wearable device and the power supply method for the intelligent wearable device. The intelligent wearable device can detect the output voltage of the battery-powered unit when the intelligent wearable device is worn; and when the output voltage is less than the preset first voltage threshold, control the non-basic functional unit to stop working, and control the self-powered unit to supply power to the basic functional unit, where when the output voltage is less than the first voltage threshold, it indicates that the battery-powered unit cannot output a current; or when the output voltage is greater than or equal to the preset first voltage threshold, control the self-powered unit and the battery-powered unit to supply power to the basic functional unit and the non-basic functional unit; where the self-powered unit continuously generates power when the intelligent wearable device is worn; the basic functional unit is configured to complete a main function of the intelligent wearable device; and the non-basic functional unit is configured to complete another function other than the main function in functions of the intelligent wearable device.

Based on the foregoing solutions, the intelligent wearable device provided in the embodiments of the present disclosure includes a self-powered unit. The self-powered unit can continuously generate power when the intelligent wearable device is worn. Compared with an existing intelligent wearable device, when the output voltage of the battery-powered unit is less than the first voltage threshold, the intelligent wearable device provided in the embodiments of the present disclosure can control the non-basic functional unit to stop working, and control the self-powered unit to supply power to the basic functional unit in order to ensure that the intelligent wearable device can still complete a basic main function within a specific time period when a battery cannot output a current; and when the output voltage of the battery-powered unit is greater than or equal to the first voltage threshold, the intelligent wearable device can control the battery-powered unit and the self-powered unit to supply power to the basic functional unit and the non-basic functional unit in order to reduce electric energy consumption of the battery-powered unit, thereby prolonging a standby time of the battery-powered unit.

BRIEF DESCRIPTION OF DRAWINGS

To describe the technical solutions in the embodiments of the present disclosure more clearly, the following briefly describes the accompanying drawings required for describing the embodiments or the prior art. The described embodiments are merely some but not all of the embodiments of the present disclosure.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

It should be noted that the terms "first", "second", and "third" in the embodiments of the present disclosure are merely intended for a purpose of description and used to distinguish different objects described, and shall not be understood as an indication or implication of relative importance or implicit indication of the number of indicated technical features.

Figure 1:
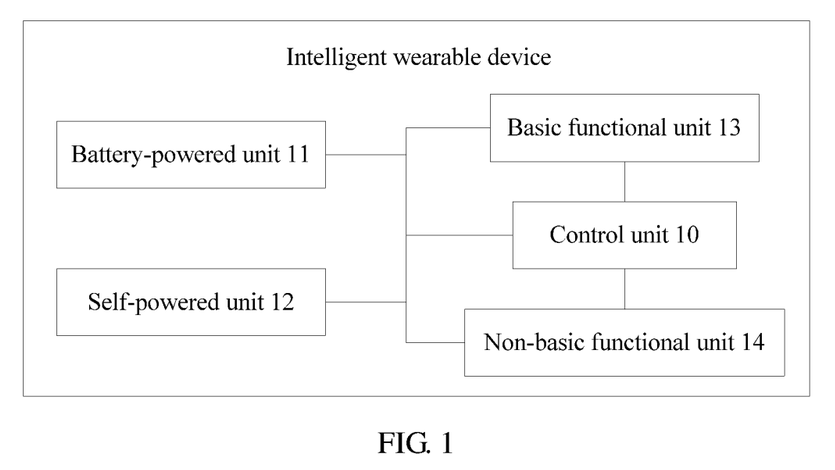
FIG. 1 is a first schematic structural diagram of an intelligent wearable device according to an embodiment of the present disclosure.

As shown in FIG. 1, an embodiment of the present disclosure provides an intelligent wearable device, including a control unit 10, and a battery-powered unit 11, a self-powered unit 12, a basic functional unit 13, and a non-basic functional unit 14 that are connected to the control unit 10.

The control unit 10 is configured to detect an output voltage of the battery-powered unit 11 when the intelligent wearable device is worn.

The control unit 10 is further configured to, when the output voltage is less than a preset first voltage threshold, control the non-basic functional unit 14 to stop working, and control the self-powered unit 12 to supply power to the basic functional unit 13, where when the output voltage is less than the first voltage threshold, it indicates that the battery-powered unit 11 cannot output a current.

The control unit 10 is further configured to, when the output voltage is greater than or equal to the preset first voltage threshold, control the self-powered unit 12 and the battery-powered unit 11 to supply power to the basic functional unit 13 and the non-basic functional unit 14.

The self-powered unit 12 continuously generates power when the intelligent wearable device is worn.

The basic functional unit 13 is configured to complete a main function of the intelligent wearable device under control of the control unit 10.

The non-basic functional unit 14 is configured to complete another function other than the main function in functions of the intelligent wearable device under control of the control unit 10.

It should be noted that in this embodiment of the present disclosure, different intelligent wearable devices may have different main functions.

For example, when the intelligent wearable device is a smart health monitoring band, a main function of the smart health monitoring band is, when people wear the smart health monitoring band, detecting and analyzing a health value of a human body, and presenting an analysis result to the user. Basic functional units of the smart health monitoring band may include a health detection sensor and Bluetooth low energy (BLE). In an embodiment, a control unit controls the health detection sensor to collect related data of a human body, for example, a blood flow rate and a pulse rate, and sort and analyze the data collected by the health detection sensor, and then controls the BLE to send an analysis result to a terminal.

In addition to the foregoing main function, the smart health monitoring band may further have a display function, a vibration prompt function, a sound prompt function, and the like. In this case, non-basic functional units of the smart health monitoring band may include a display unit, a vibration prompt unit, a sound prompt unit, and the like.

When the intelligent wearable device is a smart sports band, and a main function of the smart sports band is detecting an exercise status of a human body, basic functional units of the smart sports band include an exercise detection sensor and a BLE. The exercise detection sensor collects data in an exercising process of a human body under control of a control unit, for example, acceleration, an average speed, an exercise time, and a distance. The control unit sorts and analyzes the data collected by the exercise detection sensor, and controls the BLE to send an analysis result to a terminal.

In addition to the foregoing main function, the smart sports band may further have a music playing function, a display unit, a conventional Bluetooth communication function, and the like. In this case, non-basic functional units of the smart sports band may include a display unit, a music playing functional unit, a conventional Bluetooth communications unit, and the like.

When the intelligent wearable device is a smart watch, and main functions of the smart watch include a timing and time displaying function, and exercise and health detection, basic functional units of the smart watch include a timing and time displaying unit and an exercise and health sensor. The timing and time displaying unit and the exercise and health sensor complete timing and time displaying, and exercise and health detection under control of a control unit.

In addition to the foregoing main functions, the smart watch further has a GPS positioning function, a WIFI communication function, a calling function, and the like, and non-basic functional units of the smart watch include a GPS unit, a WIFI communications unit, a calling unit, and the like.

When the intelligent wearable device is a smart tag, and a main function of the smart tag is a communication function, a basic functional unit of the smart watch includes a BLE.

In addition to the foregoing main function, the smart tag further has a vibration prompt function, a sound prompt function, and the like, and non-basic functional units of the smart tag include a vibration prompt unit, a sound output unit, and the like.

Further, in this embodiment of the present disclosure, the control unit 10 may include a MCU that is configured to control the intelligent wearable device. For example, the MCU may be a super low power-consuming single-chip microcomputer, such as a single-chip microcomputer of MSP430 series.

Figure 2:
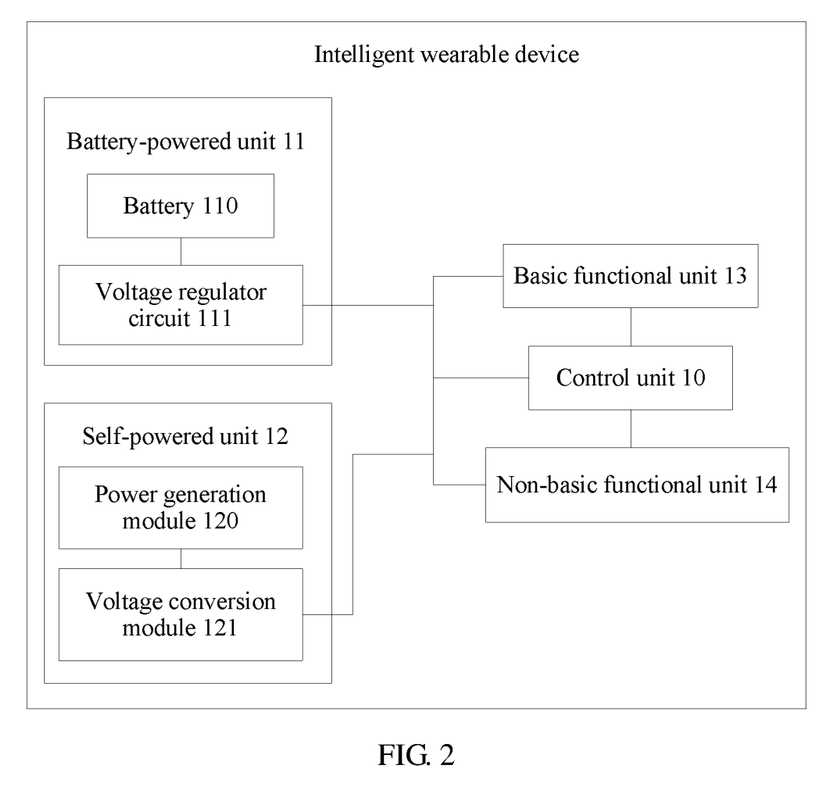
FIG. 2 is a second schematic structural diagram of an intelligent wearable device according to an embodiment of the present disclosure.

With reference to FIG. 1, as shown in FIG. 2, the battery-powered unit 11 may include a battery 110, for example, a lithium-ion battery, and may further include a voltage regulator circuit 111 configured to perform voltage-regulation conversion on a voltage output by the battery 110 in order to ensure that a voltage that is input to the intelligent wearable device is a stable voltage. The battery is connected to the voltage regulator circuit 111, and the voltage regulator circuit is connected to the control unit 10, the basic functional unit 13, and the non-basic functional unit 14.

The self-powered unit 12 includes a power generation module 120 and a voltage conversion module 121 that is connected to the power generation module 120, the control unit 10, the basic functional unit 13, and the non-basic functional unit 14.

The power generation module 120 is configured to obtain environment energy, convert the environment energy into a first voltage, and transmit the first voltage to the voltage conversion unit.

For example, the environment energy may include solar energy, or energy generated by vibration, pressure, friction, a temperature difference, or the like.

In an embodiment, for different kinds of environment energy, different power generation modules 120 may be selected for the intelligent wearable device. For example, when the environment energy is solar energy, the power generation module 120 is a solar power generation module. When the environment energy is energy generated by vibration, the power generation module 120 is a vibration power generation module. When the environment energy is energy generated by friction, the power generation module 120 is a friction power generation unit. When the environment energy is energy generated by pressure, the power generation module 120 may be a piezoelectric module. When the environment energy is energy generated by a temperature difference, the power generation module 120 is a temperature-difference power generation module.

The voltage conversion module 121 is configured to receive the first voltage transmitted by the power generation module 120, and convert the first voltage into a working voltage of the intelligent wearable device.

It may be understood that voltages output by different power generation modules are different. For example, a voltage output by the piezoelectric module is a small voltage of tens of millivolt, but a voltage output by the friction power generation module may be an alternating-current voltage greater than 100 volts. Therefore, the first voltage transmitted by the power generation module 120 needs to be converted into a working voltage of the intelligent wearable device using the voltage conversion module 121. For example, it is assumed that the working voltage of the intelligent wearable device is generally a voltage of 2-3.5 volts. The power generation module 120 is a piezoelectric module, a voltage output by the piezoelectric module is 50 millivolts, and the voltage conversion module 121 needs to convert the received voltage of 50 millivolts into a voltage of 2-3.5 volts.

Optionally, to ensure stability of the first voltage converted using the voltage conversion module 121, a voltage buffer submodule may further be disposed in the voltage conversion module 121. For example, a capacitor may be disposed in the voltage conversion module 121 in order to implement a voltage regulation operation on the first voltage converted using the voltage conversion module 121.

An output voltage of the battery-powered unit 11 of the intelligent wearable device provided in this embodiment of the present disclosure can be detected in a process in which the intelligent wearable device is worn. On one hand, when the output voltage is less than the first voltage threshold, that is, when the battery-powered unit 11 cannot supply power because the battery-powered unit 11 cannot output a current, the control unit 10 controls the non-basic functional unit 14 to stop working, and controls the self-powered unit 12 to supply power to the basic functional unit 13.

It should be noted that the self-powered unit 12 may be incapable of providing enough power for both the basic functional unit 13 and the non-basic functional unit 14. Therefore, in this embodiment of the present disclosure, to ensure that the basic functional unit 13 can work normally, the control unit 10 controls the non-basic functional unit 14 to stop working in order to reduce power consumption of the non-basic functional unit 14, and controls the self-powered unit 12 to supply power to the basic functional unit 13 such that electric energy of the self-powered unit 12 is sufficient to supply power to the basic functional unit 13. Therefore, when the battery-powered unit 11 cannot output a current, it is ensured that the basic functional unit can still complete the main function of the intelligent wearable device within a specific time period under control of the control unit 102.

It should be noted that if the self-powered unit 12 is not damaged, the self-powered unit 12 can consistently keep a power generation state when the intelligent wearable device is worn such that the basic functional unit can consistently complete the main function of the intelligent wearable device under control of the control unit 102.

On the other hand, when the output voltage is greater than or equal to the first voltage threshold, that is, when power of the battery-powered unit 11 is sufficient and a current can be output, the control unit 10 controls the battery-powered unit 11 and the self-powered unit 12 to supply power to the basic functional unit 13 and the non-basic functional unit 14. For example, the control unit 10 controls the battery-powered unit 11 and the self-powered unit 12 to supply power to the basic functional unit 13 and the additional functional unit 14 in a load sharing manner in order to reduce an output current of the battery-powered unit 11, thereby prolonging a standby time of the battery-powered unit 11.

Optionally, the control unit 10 is configured to send a sleep instruction to the non-basic functional unit 14 when the output voltage is less than the preset first voltage threshold, where the sleep instruction is used to instruct the non-basic functional unit to enter a sleep mode.

The non-basic functional unit 14 is configured to receive the sleep instruction sent by the control unit 10, and enter the sleep mode according to an indication of the sleep instruction.

It may be understood that after the non-basic functional unit 14 enters the sleep mode, the non-basic functional unit 14 no longer consumes electric energy provided by the self-powered unit 12. Therefore, in this embodiment of the present disclosure, the control unit 10 may control the non-basic functional unit 14 to stop working by instructing the non-basic functional unit 14 to enter a sleep mode.

Further, the control unit 10 is further configured to, after sending the sleep instruction to the non-basic functional unit 14, if it is detected that the output voltage is greater than or equal to a preset second voltage threshold, send a working instruction to the non-basic functional unit 14, where the working instruction is used to instruct the non-basic functional unit 14 to enter a working mode, and the second voltage threshold is greater than or equal to the first voltage threshold.

The non-basic functional unit 14 is further configured to receive the working instruction sent by the control unit, and enter the working mode according to an indication of the working instruction.

It may be understood that after the non-basic functional unit 14 enters a sleep state, the control unit 10 still detects the output voltage of the battery-powered unit 11 in real time. When the output voltage is greater than or equal to the preset second voltage threshold, that is, it may be understood that after the battery-powered unit 11 is charged, the output voltage of the battery-powered unit 11 restores to normal, the battery-powered unit 11 can output a current, and can continue to supply power to the basic functional unit 13 and the non-basic functional unit 14, the control unit 10 may send the working instruction to the non-basic functional unit 14, to instruct the non-basic functional unit 14 to enter a working state again. Then, the control unit 10 may control the battery-powered unit 11 and the self-powered unit 12 to supply power to the basic functional unit 13 and the non-basic functional unit 14 in a load sharing manner.

The second voltage threshold is greater than or equal to the first voltage threshold. Preferably, the second voltage threshold is greater than the first voltage threshold. Generally, the second voltage threshold is a sum of the first voltage threshold and a hysteresis. The hysteresis can be used to avoid vibration that occurs when the intelligent wearable device controls the non-basic functional module 14 to enter the working mode again.

Optionally, the control unit 10 is configured to disable the non-basic functional unit 14 when the output voltage is less than the preset first voltage threshold.

In this embodiment of the present disclosure, when the output voltage of the battery-powered unit 11 is less than the first voltage threshold, to ensure that the basic functional unit 13 can work normally, the control unit 10 may directly disable the non-basic functional unit such that the non-basic functional unit 14 no longer consumes electric energy of the self-powered unit 12, and the electric energy of the self-powered unit 12 is sufficient to supply power to the basic functional unit 13. Therefore, when the battery-powered unit 11 cannot output a current, it is ensured that the basic functional unit 13 can still complete the main function of the intelligent wearable device under control of the control unit 10.

Figure 3:
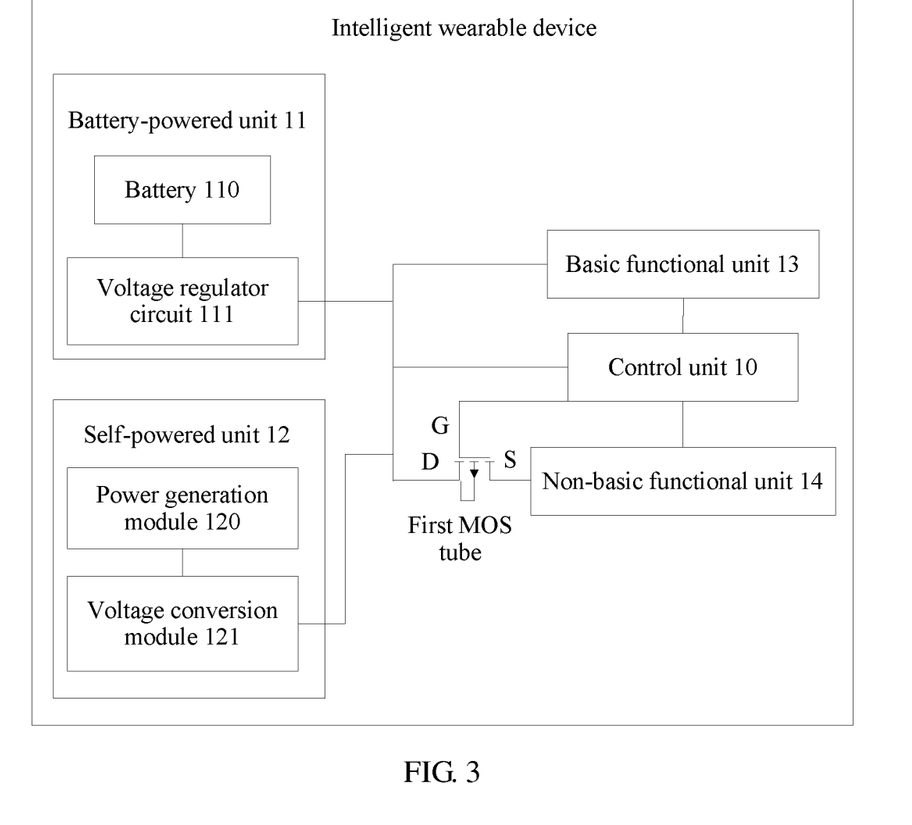
FIG. 3 is a third schematic structural diagram of an intelligent wearable device according to an embodiment of the present disclosure.

For example, the control unit 10 may disable the non-basic functional unit 14 by cutting off a first switching transistor. In an embodiment, with reference to FIG. 2, as shown in FIG. 3, FIG. 3 is a schematic structural diagram of an intelligent wearable device according to an embodiment of the present disclosure. The first switching transistor may be a first metal-oxide semiconductor (MOS) tube, a drain (D) electrode of the first MOS tube is connected to the battery-powered unit 11 and the self-powered unit 12, a gate (G) electrode of the first MOS tube is connected to the control unit 10, and a source (S) electrode of the first MOS tube is connected to the non-basic functional unit 14. Therefore, when detecting that the output voltage of the battery-powered unit 11 is less than the first voltage threshold, the control unit disables the non-basic functional unit 14 by cutting off the first MOS tube.

Further, the control unit 10 is further configured to, after disabling the non-basic functional unit 14, if it is detected that the output voltage is greater than or equal to a preset second voltage threshold, enable the non-basic functional unit 14, where the second voltage threshold is greater than or equal to the first voltage threshold.

For example, as shown in FIG. 3, after the control unit 10 disables the non-basic functional unit 14, the control unit 10 still detects the output voltage of the battery-powered unit 11 in real time. When the output voltage is greater than or equal to the preset second voltage threshold, the control unit 10 may conduct the first MOS tube to enable the non-basic functional unit 14 in order to control the battery-powered unit 11 and the self-powered unit 12 to jointly supply power to the basic functional unit 13 and the non-basic functional unit 14 in a load sharing manner. Therefore, the non-basic functional unit 14 can continue to complete a function other than the main function in the functions of the intelligent wearable device under control of the control unit 10.

Optionally, the control unit 10 is further configured to disable the battery-powered unit 11 when the output voltage is less than the preset first voltage threshold.

It should be noted that in this embodiment of the present disclosure, when the output voltage of the battery-powered unit 11 is less than the first voltage threshold, because the output voltage of the battery-powered unit 11 is lower than an output voltage of the self-powered unit 12, the self-powered unit 12 may charge the battery-powered unit 11 in a reserve direction. Therefore, to avoid a problem that electric energy of the self-powered unit 12 is consumed because the self-powered unit 12 charges the battery-powered unit 11 in a reserve direction, the control unit 10 may disable the battery-powered unit 11 when the output voltage of the battery-powered unit 11 is less than the first voltage threshold.

For example, the control unit 10 may disable the battery-powered unit 11 by cutting off a second switching transistor. In an embodiment, with reference to FIG. 2, as shown in FIG. 4, the second switching transistor may be a second MOS tube, a D electrode of the second MOS tube is connected to the battery-powered unit 11, a G electrode of the second MOS tube is connected to the control unit 102, and an S electrode of the second MOS tube is connected to the basic functional unit 13, the non-basic functional unit 14, and the self-powered unit 12.

When the control unit 10 detects that the output voltage of the battery-powered unit 11 is less than the first voltage threshold, the control unit 10 may disable the battery-powered unit 11 by cutting off the second MOS tube. In this way, the output voltage of the self-powered unit 12 cannot be transmitted to the battery-powered unit 11, and the self-powered unit 12 is prevented from charging the battery-powered unit 11 in a reverse direction.

Further, the control unit 10 is further configured to, after disabling the battery-powered unit 11, if it is detected that the output voltage is greater than or equal to a preset second voltage threshold, enable the battery-powered unit 11, where the second voltage threshold is greater than or equal to the first voltage threshold.

Figure 4:
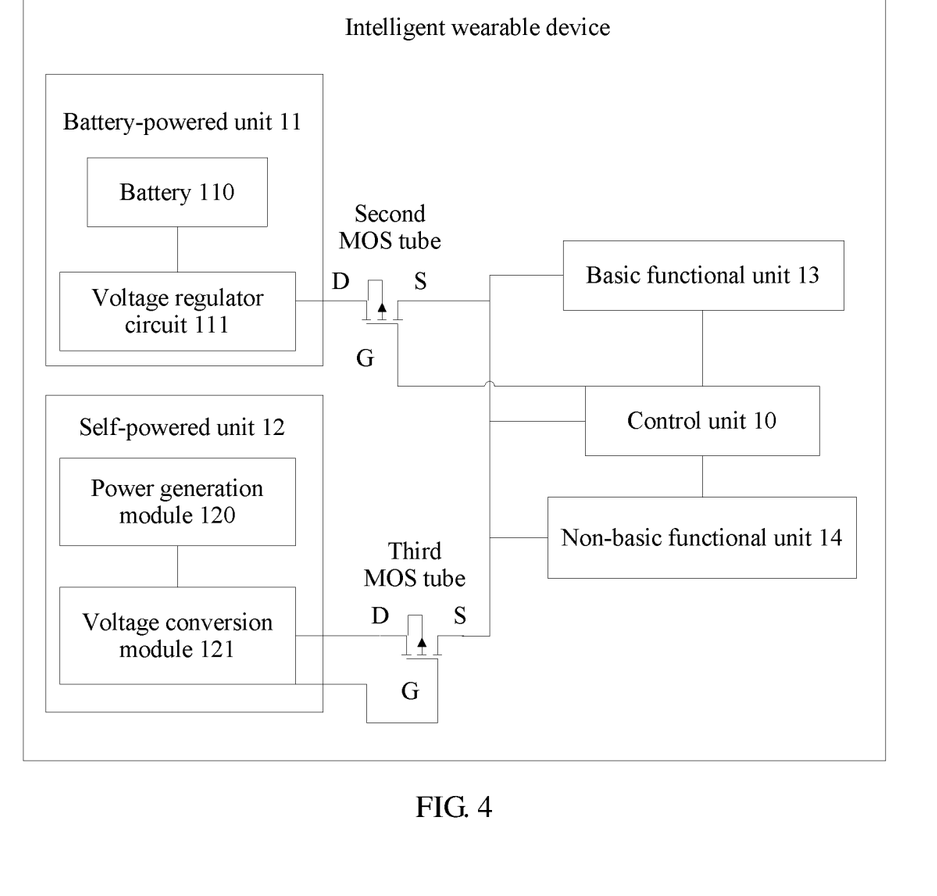
FIG. 4 is a fourth schematic structural diagram of an intelligent wearable device according to an embodiment of the present disclosure.

It may be understood that, with reference to FIG. 4, after the control unit 10 disables the battery-powered unit 11, the control unit 10 still detects the output voltage of the battery-powered unit 11 in real time. When the output voltage is greater than or equal to the preset second voltage threshold, the control unit 10 may enable the battery-powered unit 11 again by conducting the second MOS tube such that the battery-powered unit 11 and the self-powered unit 12 can continue to supply power to the non-basic functional unit 14 and the basic functional unit 13 in a load sharing manner under control of the control unit 10.

Further, the self-powered unit 12 probably cannot output a voltage in a using process because of damage or other reasons. Therefore, to avoid a problem that electric energy of the battery-powered unit 11 is wasted because the battery-powered unit 11 supplies power to the self-powered unit 12 in a reverse direction when the self-powered unit 12 cannot output a voltage, in this embodiment of the present disclosure, a third switching transistor that is connected to the self-powered unit 12 may be disposed, for example, a third MOS tube, and cutoff and conduction of the third MOS tube are controlled using a power good (P.G) signal that is sent by a P.G pin of the self-powered unit 12.

Further, as shown in FIG. 4, the self-powered unit 12 is connected to a D electrode of the third MOS tube, an S electrode of the third MOS tube is connected to the battery-powered unit 11, the basic functional unit 13, and the non-basic functional unit 14, and a G electrode of the third MOS tube is connected to the self-powered unit 12 using the P.G pin. When the self-powered unit 12 detects that the self-powered unit 12 can normally output a voltage, the self-powered unit 12 sends a high-level P.G signal to the third MOS tube using the P.G pin in order to enable the third MOS tube of the self-powered unit 12 to keep conducted. When the self-powered unit 12 detects that the self-powered unit 12 cannot normally output a voltage, the self-powered unit 12 sends a low-level P.G signal to the third MOS tube using the P.G pin to disconnect the third MOS tube such that an output voltage of the battery-powered unit 11 cannot be transmitted to the self-powered unit 12. Therefore, the battery-powered unit 11 is prevented from charging the self-powered unit 12 in a reverse direction when the self-powered unit 12 cannot output a voltage, thereby saving electric energy of the battery-powered unit 11.

In addition, it should be noted that the foregoing manner in which a MOS tube is used as a switching transistor to implement connection and disconnection operations on a power supply path is merely an example, or another switch circuit such as a triode may be used to implement connection and disconnection operations on a power supply path. This is not limited in the present disclosure.

This embodiment of the present disclosure provides the intelligent wearable device. The intelligent wearable device can detect the output voltage of the battery-powered unit when the intelligent wearable device is worn; and when the output voltage is less than the preset first voltage threshold, control the non-basic functional unit to stop working, and control the self-powered unit to supply power to the basic functional unit, where when the output voltage is less than the first voltage threshold, it indicates that the battery-powered unit cannot output a current; or when the output voltage is greater than or equal to the preset first voltage threshold, control the self-powered unit and the battery-powered unit to supply power to the basic functional unit and the non-basic functional unit. The self-powered unit continuously generates power when the intelligent wearable device is worn. The basic functional unit is configured to complete a main function of the intelligent wearable device under control of the control unit. The non-basic functional unit is configured to complete another function other than the main function in functions of the intelligent wearable device under control of the control unit.

Based on the foregoing solution, the intelligent wearable device provided in this embodiment of the present disclosure includes a self-powered unit. The self-powered unit can continuously generate power when the intelligent wearable device is worn. Compared with an existing intelligent wearable device, when the output voltage of the battery-powered unit is less than the first voltage threshold, the intelligent wearable device provided in this embodiment of the present disclosure can control the non-basic functional unit to stop working, and control the self-powered unit to supply power to the basic functional unit in order to ensure that the intelligent wearable device can still complete a basic main function within a specific time period when a battery cannot output a current; and when the output voltage of the battery-powered unit is greater than or equal to the first voltage threshold, the intelligent wearable device can control the battery-powered unit and the self-powered unit to supply power to the basic functional unit and the non-basic functional unit in order to reduce electric energy consumption of the battery-powered unit, thereby prolonging a standby time of the battery-powered unit.

Figure 5:
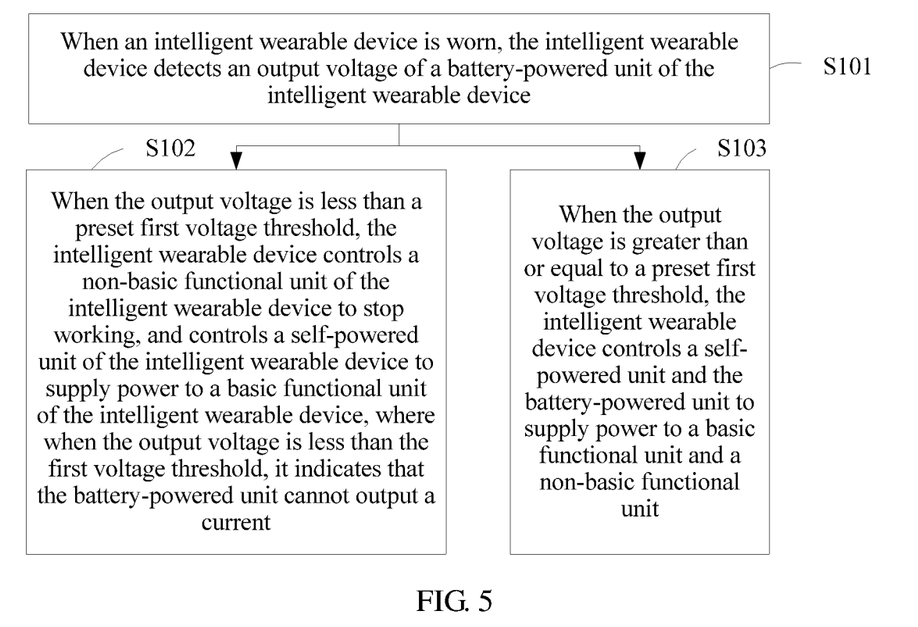
FIG. 5 is a flowchart of a power supply method for an intelligent wearable device according to an embodiment of the present disclosure.

As shown in FIG. 5, an embodiment of the present disclosure provides a power supply method for an intelligent wearable device. The power supply method is applied to the intelligent wearable device according to any one of FIG. 1 to FIG. 4, and includes the following steps.

S101. When an intelligent wearable device is worn, the intelligent wearable device detects an output voltage of a battery-powered unit of the intelligent wearable device.

Further, the intelligent wearable device provided in this embodiment of the present disclosure includes a control unit, a battery-powered unit, a self-powered unit, a basic functional unit, a non-basic functional unit, and the like.

The self-powered unit continuously generates power when the intelligent wearable device is worn.

The basic functional unit is configured to complete a main function of the intelligent wearable device.

The non-basic functional unit is configured to complete another function other than the main function in functions of the intelligent wearable device.

Further, for specific meanings of the control unit, the battery-powered unit, the self-powered unit, the basic functional unit, and the non-basic functional unit, refer to the related description in the embodiment shown in FIG. 2, and details are not described herein.

It may be understood that in this embodiment of the present disclosure, the control unit completes detection of a voltage of the battery-powered unit, and subsequent control work.

S102. When the output voltage is less than a preset first voltage threshold, the intelligent wearable device controls a non-basic functional unit of the intelligent wearable device to stop working, and controls a self-powered unit of the intelligent wearable device to supply power to a basic functional unit of the intelligent wearable device, where when the output voltage is less than the first voltage threshold, it indicates that the battery-powered unit cannot output a current.

In this embodiment of the present disclosure, when the output voltage is less than the preset first voltage threshold, and the battery-powered unit cannot output a current and therefore cannot supply power to the basic functional unit, the non-basic functional unit, and the control unit, only the self-powered unit supplies power to the basic functional unit, the non-basic functional unit 14, and the control unit.

The self-powered unit may be incapable of providing enough power for the basic functional unit, the additional functional unit, and the control unit. Therefore, in this embodiment of the present disclosure, to ensure that the basic functional unit can work normally, the intelligent wearable device may control the non-basic functional unit to stop working such that the non-basic functional unit can be prevented from consuming electric energy of the self-powered unit, and the electric energy output by the self-powered unit can ensure normal working of the basic functional unit and the control unit. Therefore, when the output voltage of the battery-powered unit is less than the first voltage threshold, it is ensured that the basic functional unit can still complete the main function of the intelligent wearable device.

S103. When the output voltage is greater than or equal to a preset first voltage threshold, the intelligent wearable device controls the self-powered unit and the battery-powered unit to supply power to the basic functional unit and the non-basic functional unit.

In this embodiment of the present disclosure, when the output voltage is greater than or equal to the preset first voltage threshold, that is, when the battery-powered module can output a current to supply power to the intelligent wearable device, the intelligent wearable device may control the battery-powered unit and the self-powered unit to jointly supply power to the basic functional unit and the non-basic functional unit.

For example, the intelligent wearable device controls the battery-powered unit and the self-powered unit to jointly supply power to the basic functional unit and the non-basic functional unit in a load sharing manner in order to reduce electric energy consumption of the battery-powered unit, thereby prolonging a standby time of the battery-powered unit.

Optionally, in this embodiment of the present disclosure, that the intelligent wearable device controls the non-basic functional unit to stop working in S102 may be further implemented in the following two manners.

Manner 1: The intelligent wearable device sends a sleep instruction to the non-basic functional unit, where the sleep instruction is used to instruct the non-basic functional unit to enter a sleep mode.

It may be understood that when the non-basic functional unit enters the sleep mode, the non-basic functional unit no longer consumes electric energy provided by the self-powered unit. Therefore, the electric energy output by the self-powered unit can ensure normal working of the basic functional unit and the control unit.

Further, after the intelligent wearable device sends the sleep instruction to the non-basic functional unit, the intelligent wearable device still detects the output voltage of the battery-powered unit in real time.

If the intelligent wearable device detects that the output voltage is greater than or equal to a preset second voltage threshold, the intelligent wearable device sends a working instruction to the non-basic functional unit, where the working instruction is used to instruct the non-basic functional unit to enter a working mode, and the second voltage threshold is greater than or equal to the first voltage threshold.

It may be understood that when the output voltage is greater than or equal to the preset second voltage threshold, that is, when the battery-powered unit of the intelligent wearable device can output a current after being charged, the intelligent wearable device may send the working instruction to the non-basic functional unit such that the non-basic functional unit enters the working mode again, and then both the battery-powered unit and the self-powered unit supply power to the basic functional unit and the non-basic functional unit.

Manner 2: The intelligent wearable device disables the non-basic functional unit.

In this embodiment of the present disclosure, when the output voltage is less than the preset first voltage threshold, to ensure that the basic functional unit can work normally, the intelligent wearable device may further disable the non-basic functional unit such that the non-basic functional unit no longer consumes power, thereby ensuring that electric energy of the self-powered unit is sufficient to supply power to the basic functional unit. Therefore, the basic functional unit can still complete the main function of the intelligent wearable device.

Further, after the intelligent wearable device disables the non-basic functional unit, the intelligent wearable device still detects the output voltage of the battery-powered unit in real time.

If the intelligent wearable device detects that the output voltage is greater than or equal to a preset second voltage threshold, the intelligent wearable device enables the non-basic functional unit, where the second voltage threshold is greater than or equal to the first voltage threshold.

It may be understood that when the battery-powered unit of the intelligent wearable device can output a current after being charged, the intelligent wearable device may enable the non-basic functional unit again such that the non-basic functional unit continues to complete a function other than the main function in the functions of the intelligent wearable device.

Further, when the output voltage of the battery-powered unit is less than the first voltage threshold, because the output voltage of the battery-powered unit is lower than an output voltage of the self-powered unit, the self-powered unit may charge the battery-powered unit in a reverse direction.

To prevent the self-powered unit from charging the battery-powered unit in a reserve direction, when the output voltage is less than the first voltage threshold, the intelligent wearable device may disable the battery-powered unit.

Further, after the battery-powered unit is disabled, the intelligent wearable device still detects the output voltage of the battery-powered unit in real time.

If the intelligent wearable device detects that the output voltage is greater than or equal to a preset second voltage threshold, the intelligent wearable device enables the battery-powered unit, where the second voltage threshold is greater than or equal to the first voltage threshold.

That is, after the intelligent wearable device determines, by detecting the output voltage of the battery-powered unit, that the battery-powered unit can output a current after being charged, the intelligent wearable device may enable the battery-powered unit again, to control the battery-powered unit and the self-powered unit to supply power to the additional functional unit and the basic functional unit.

This embodiment of the present disclosure provides the power supply method for an intelligent wearable device. The power supply method is applied to the intelligent wearable device provided in the embodiments of the present disclosure, and includes detecting, by the intelligent wearable device, the output voltage of the battery-powered unit of the intelligent wearable device; and when the output voltage is less than the preset first voltage threshold, controlling, by the intelligent wearable device, the non-basic functional unit of the intelligent wearable device to stop working, and controlling the self-powered unit of the intelligent wearable device to supply power to the basic functional unit of the intelligent wearable device, where when the output voltage is less than the first voltage threshold, it indicates that the battery-powered unit cannot output a current; or when the output voltage is greater than or equal to the preset first voltage threshold, controlling, by the intelligent wearable device, the self-powered unit and the battery-powered unit to supply power to the basic functional unit and the non-basic functional unit.

Based on the foregoing solution, the intelligent wearable device provided in this embodiment of the present disclosure includes a self-powered unit. The self-powered unit can continuously generate power when the intelligent wearable device is worn. Compared with an existing intelligent wearable device, when the output voltage of the battery-powered unit is less than the first voltage threshold, the intelligent wearable device provided in this embodiment of the present disclosure can control the non-basic functional unit to stop working, and control the self-powered unit to supply power to the basic functional unit in order to ensure that the intelligent wearable device can still complete a basic main function within a specific time period when a battery cannot output a current; and when the output voltage of the battery-powered unit is greater than or equal to the first voltage threshold, the intelligent wearable device can control the battery-powered unit and the self-powered unit to supply power to the basic functional unit and the non-basic functional unit in order to reduce electric energy consumption of the battery-powered unit, thereby prolonging a standby time of the battery-powered unit.

Figure 6:
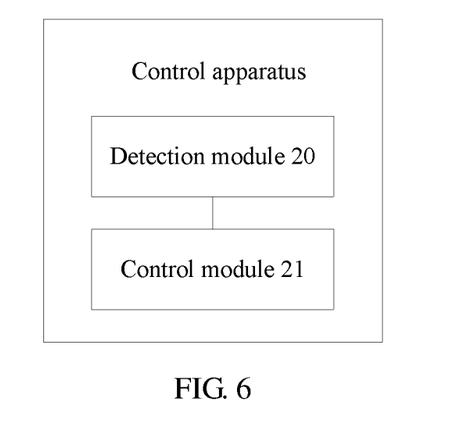
FIG. 6 is a schematic structural diagram of a control apparatus according to an embodiment of the present disclosure.

As shown in FIG. 6, an embodiment of the present disclosure provides a control apparatus, and the control apparatus is configured to perform steps in the power supply method for an intelligent wearable device shown in FIG. 5. The control apparatus may include modules corresponding to the corresponding steps. For example, the control module includes a detection module 20 and a control module 21.

The detection module 20 is configured to detect an output voltage of a battery-powered unit of an intelligent wearable device when the intelligent wearable device is worn.

The control module 21 is configured to, when the detection unit 20 detects that the output voltage is less than a preset first voltage threshold, control a non-basic functional unit of the intelligent wearable device to stop working, and control a self-powered unit of the intelligent wearable device to supply power to a basic functional unit of the intelligent wearable device, where when the output voltage is less than the first voltage threshold, it indicates that the battery-powered unit cannot output a current.

The control module 21 is further configured to, when the detection unit 20 detects that the output voltage is greater than or equal to the preset first voltage threshold, control the self-powered unit and the battery-powered unit to supply power to the basic functional unit and the non-basic functional unit.

The self-powered unit continuously generates power when the intelligent wearable device is worn.

The basic functional unit is configured to complete a main function of the intelligent wearable device.

The non-basic functional unit is configured to complete another function other than the main function in functions of the intelligent wearable device.

Optionally, the control module 21 is further configured to send a sleep instruction to the non-basic functional unit, where the sleep instruction is used to instruct the non-basic functional unit to enter a sleep mode.

Optionally, the control module 21 is further configured to, after sending the sleep instruction to the non-basic functional unit, if the detection module 20 detects that the output voltage is greater than or equal to a preset second voltage threshold, send a working instruction to the non-basic functional unit, where the working instruction is used to instruct the non-basic functional unit to enter a working mode, and the second voltage threshold is greater than or equal to the first voltage threshold.

Optionally, the control module 21 is further configured to disable the non-basic functional unit.

Optionally, the control module 21 is further configured to, after disabling the non-basic functional unit, if the detection module 20 detects that the output voltage is greater than or equal to a preset second voltage threshold, enable the non-basic functional unit, where the second voltage threshold is greater than or equal to the first voltage threshold.

Optionally, the control module 21 is further configured to disable the battery-powered unit when the output voltage is less than the preset first voltage threshold.

Optionally, the control module 21 is further configured to, after disabling the battery-powered unit, if the detection module 20 detects that the output voltage is greater than or equal to a preset second voltage threshold, enable the battery-powered unit, where the second voltage threshold is greater than or equal to the first voltage threshold.

This embodiment of the present disclosure provides the control apparatus. The control apparatus can detect the output voltage of the battery-powered unit of the intelligent wearable device when the intelligent wearable device is worn; and when the output voltage is less than the preset first voltage threshold, the intelligent wearable device controls the non-basic functional unit of the intelligent wearable device to stop working, and controls the self-powered unit of the intelligent wearable device to supply power to the basic functional unit of the intelligent wearable device, where when the output voltage is less than the first voltage threshold, it indicates that the battery-powered unit cannot output a current; or when the output voltage is greater than or equal to the preset first voltage threshold, the intelligent wearable device controls the self-powered unit and the battery-powered unit to supply power to the basic functional unit and the non-basic functional unit.

Based on the foregoing solution, when the output voltage of the battery-powered unit is less than the first voltage threshold, the control apparatus provided in this embodiment of the present disclosure can control the non-basic functional unit to stop working, and control the self-powered unit to supply power to the basic functional unit in order to ensure that the intelligent wearable device can still complete a basic main function within a specific time period when a battery cannot output a current; and when the output voltage of the battery-powered unit is greater than or equal to the first voltage threshold, the control apparatus can control the battery-powered unit and the self-powered unit to supply power to the basic functional unit and the non-basic functional unit in order to reduce electric energy consumption of the battery-powered unit, thereby prolonging a standby time of the battery-powered unit.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or part of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An intelligent wearable device, comprising:
    a battery-powered circuit configured to provide an output voltage;
    a self-powered circuit configured to continuously generate power while the intelligent wearable device is worn, wherein the self-powered circuit does not supply the power to the battery-powered circuit while the self-powered circuit generates the power;
a basic functional circuit configured to perform a main function of the intelligent wearable device;
a non-basic functional circuit configured to perform another function other than the main function of the intelligent wearable device; and
a controller coupled to the battery-powered circuit, the self-powered circuit, the basic functional circuit, and the non-basic functional circuit, wherein the controller is configured to:
detect the output voltage while the intelligent wearable device is worn;
control the non-basic functional circuit to stop working when the output voltage is less than a preset first voltage threshold;
control the self-powered circuit to supply power to the basic functional circuit and disable the battery-powered circuit when the output voltage is less than the preset first voltage threshold, wherein the output voltage being less than the preset first voltage threshold indicates that the battery-powered circuit does not output a current;
disable the battery-powered circuit to prevent a reverse current flowing from the self-powered circuit to the battery-powered circuit when the output voltage is less than the preset first voltage threshold; and
control the self-powered circuit and the battery-powered circuit to supply power to the basic functional circuit and the non-basic functional circuit when the output voltage is greater than or equal to the preset first voltage threshold.

2. The intelligent wearable device of claim 1, wherein the controller is further configured to send a sleep instruction to the non-basic functional circuit when the output voltage is less than the preset first voltage threshold, and wherein the sleep instruction instructs the non-basic functional circuit to enter a sleep mode.

3. The intelligent wearable device of claim 2, wherein the controller is further configured to send a working instruction to the non-basic functional circuit after sending the sleep instruction to the non-basic functional circuit when the output voltage is greater than or equal to a preset second voltage threshold, wherein the working instruction instructs the non-basic functional circuit to enter a working mode, wherein the preset second voltage threshold is greater than or equal to the preset first voltage threshold, and wherein the non-basic functional circuit is further configured to:
receive the working instruction from the controller; and
enter the working mode according to the working instruction.

4. The intelligent wearable device of claim 2, wherein the non-basic functional circuit is further configured to:
receive the sleep instruction from the controller; and
enter the sleep mode according to the sleep instruction.

5. The intelligent wearable device of claim 1, wherein the controller is further configured to disable the non-basic functional circuit when the output voltage is less than the preset first voltage threshold.

6. The intelligent wearable device of claim 5, wherein the controller is further configured to enable the non-basic functional circuit after disabling the non-basic functional circuit and the output voltage is greater than or equal to a preset second voltage threshold, and wherein the preset second voltage threshold is greater than or equal to the preset first voltage threshold.

7. The intelligent wearable device of claim 1, wherein the output voltage is greater than or equal to a preset second voltage threshold, wherein the controller is further configured to enable the battery-powered circuit after disabling the battery-powered circuit when the output voltage is greater than or equal to a preset second voltage threshold, and wherein the preset second voltage threshold is greater than or equal to the preset first voltage threshold.

8. The intelligent wearable device of claim 1, wherein the self-powered circuit is further configured to:
obtain environment energy; and
convert the environment energy into a working voltage of the intelligent wearable device.

9. A power supply method implemented by an intelligent wearable device, wherein the method comprises:
detecting an output voltage of a battery-powered circuit of the intelligent wearable device while the intelligent wearable device is worn;
controlling a non-basic functional circuit of the intelligent wearable device to stop working when the output voltage is less than a preset first voltage threshold, wherein the output voltage being less than the preset first voltage threshold indicates the battery-powered circuit does not output a current;
controlling a self-powered circuit of the intelligent wearable device to supply power to a basic functional circuit of the intelligent wearable device when the output voltage is less than the preset first voltage threshold;
disabling the battery-powered circuit when the output voltage is less than the preset first voltage threshold, wherein disabling the battery-powered circuit when the output voltage is less than the preset first voltage threshold prevents a reverse current flowing from the self-powered circuit to the battery-powered circuit; and
controlling a self-powered circuit and the battery-powered circuit to supply power to the basic functional circuit and the non-basic functional circuit when the output voltage is greater than or equal to the preset first voltage threshold, wherein the self-powered circuit continuously generates the power while the intelligent wearable device is worn, wherein the self-powered circuit does not supply the power to the battery-powered circuit while the self-powered circuit generates the power, wherein the basic functional circuit is configured to complete a main function of the intelligent wearable device, and wherein the non-basic functional circuit is configured to complete another function other than the main function of the intelligent wearable device.

10. The power supply method of claim 9, wherein controlling the non-basic functional circuit of the intelligent wearable device to stop working comprises sending a sleep instruction to the non-basic functional circuit, and wherein the sleep instruction instructs the non-basic functional circuit to enter a sleep mode.

11. The power supply method of claim 10, wherein after sending the sleep instruction to the non-basic functional circuit, the power supply method further comprises sending a working instruction to the non-basic functional circuit when detecting that the output voltage is greater than or equal to a preset second voltage threshold, wherein the working instruction instructs the non-basic functional circuit to enter a working mode, and wherein the preset second voltage threshold is greater than or equal to the preset first voltage threshold.

12. The power supply method of claim 10, further comprising:

receiving, by the non-basic functional circuit, the sleep instruction from a controller; and entering, by the non-basic functional circuit, the sleep mode according to the sleep instruction.

13. The power supply method of claim 10, further comprising:

obtaining environment energy using the self-powered circuit; and converting the environment energy into a working voltage of the intelligent wearable device.

14. The power supply method of claim 9, further comprising disabling the non-basic functional circuit when the output voltage is less than the preset first voltage threshold.

15. The power supply method of claim 14, wherein after disabling the non-basic functional circuit, the method further comprises enabling the non-basic functional circuit when the intelligent wearable device detects that the output voltage is greater than or equal to a preset second voltage threshold, and wherein the preset second voltage threshold is greater than or equal to the preset first voltage threshold.

16. The power supply method of claim 9, wherein after disabling the battery-powered circuit, the method further comprises enabling the battery-powered circuit when the intelligent wearable device detects that the output voltage is greater than or equal to a preset second voltage threshold, and wherein the preset second voltage threshold is greater than or equal to the preset first voltage threshold.

* * * * *

UNITED STATES PATENT AND TRADEMARK OFFICE
CERTIFICATE OF CORRECTION

PATENT NO. : 11,080,581 B2
APPLICATION NO. : 15/965461
DATED : August 3, 2021
INVENTOR(S) : Qingyin Fang and Weifeng Duan It is certified that error appears in the above-identified patent and that said Letters Patent is hereby corrected as shown below:

On the Title Page

Page 2, item [56], delete "9,018,893 B2 4/2015 Track" and insert --9,018,893 B2 4/2015 Trock--

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*